United States Patent [19]

Manser et al.

[11] Patent Number: 5,596,480
[45] Date of Patent: Jan. 21, 1997

[54] SPLIT ROTATABLE KEYBOARD

[75] Inventors: Brian E. Manser, Salem, Wis.; Peter A. Ojeda, IV; Anton R. Poole, both of St. Joseph, Mich.; Frank W. Guoming, Arlington Heights, Ill.

[73] Assignee: Zenith Data Systems Corporation, Buffalo Grove, Ill.

[21] Appl. No.: 218,625

[22] Filed: Mar. 28, 1994

[51] Int. Cl.⁶ ........................................................ G06F 1/16
[52] U.S. Cl. .......................................... 361/680; 400/682
[58] Field of Search .................................. 345/168, 169; 364/708.1; 400/472, 489, 682, 691–693; 341/22; 312/223.2; 235/145 R; 361/680

[56] References Cited

U.S. PATENT DOCUMENTS

| | | | |
|---|---|---|---|
| 3,940,758 | 2/1976 | Margolin | 345/169 |
| 3,990,565 | 11/1976 | Felton et al. | 400/682 X |
| 4,571,456 | 2/1986 | Paulsen et al. | |
| 4,597,681 | 7/1986 | Hodges | 341/22 X |
| 4,661,005 | 4/1987 | Lahr | 400/682 X |
| 4,704,604 | 11/1987 | Fuhs | |
| 4,824,268 | 4/1989 | Diernisse | |
| 4,903,221 | 2/1990 | Krenz | |
| 5,067,834 | 11/1991 | Szmanda et al. | 361/680 X |
| 5,073,050 | 12/1991 | Andrews | |
| 5,122,786 | 6/1992 | Rader | 345/168 |
| 5,160,919 | 11/1992 | Mohler et al. | |
| 5,178,477 | 1/1993 | Gambaro | |
| 5,198,991 | 3/1993 | Pollitt | 361/680 |
| 5,424,728 | 6/1995 | Goldstein | 400/472 X |
| 5,454,652 | 10/1995 | Huellemeier et al. | 400/489 |

FOREIGN PATENT DOCUMENTS

| | | |
|---|---|---|
| 5-189084 | 7/1993 | Japan . |
| WO92/11623 | 7/1992 | WIPO . |

OTHER PUBLICATIONS

"What? More New Macks", Crystal Waters, Jun. 1993 Home Office Computing, p. 40.
Advertisement for MiniErgo keyboard, no date.

*Primary Examiner*—Michael W. Phillips
*Attorney, Agent, or Firm*—Fitch, Even, Tabin & Flannery

[57] ABSTRACT

An adjustable keyboard assembly for a portable personal computer includes a keyboard, split along a predetermined breakline defining two keyboard sections, removable from the portable personal computer. In order to facilitate angular positioning of the keyboard sections as well as removal of the keyboard sections from the portable personal computer housing, the keyboard sections are mechanically coupled together, for example, with a hinge at one end of the breakline. Such a configuration enables the relative angular positions of the keyboard sections to be custom positioned by the individual user for maximum adjustability in accordance with the user's preference both on and removed from the portable personal computer housing. Unlike other known keyboards, the keyboard, in accordance with the present invention, is formed in standard QWERTY format so as not to require retraining of users.

4 Claims, 5 Drawing Sheets

SPLIT ROTATABLE KEYBOARD

CROSS-REFERENCE TO RELATED APPLICATIONS

This application is related to Reissue application Ser. No. 07/429,927, filed on Oct. 31, 1989, now abandoned.

BACKGROUND OF THE INVENTION

1. Field of the Invention

The present invention relates to a keyboard assembly for a portable personal computer and, more particularly, to an adjustable keyboard assembly for a portable personal computer, such as a notebook computer, which includes a removable split keyboard to allow selectable positioning of the split sections of the keyboard while carried by or removed frown the portable personal computer housing to provide adjustability in accordance with the preference of the user.

2. Description of the Prior Art

Alternate keyboard designs for personal computers are generally known in the art. Examples of such alternate keyboards are disclosed in U.S. Pat. Nos. 4,571,456; 4,704,604; 4,824,268; 4,903,221; 5,073,050; 5,160,919; 5,178,477; and published PCT application PCT/US91/09448, published on Jul. 9, 1992. More particularly, U.S. Pat. Nos. 4,571,456; 4,704,604 and 4,903,221 illustrate an early approach to an alternate design for a portable personal computer. In particular, the '456 patent discloses a portable personal computer with one or more adjustment legs for supporting one end of the portable personal computer such that the keyboard is disposed at an acute angle relative to the surface on which the portable personal computer is resting. The '604 and '221 patents disclose portable personal computers with detachable keyboards. Unfortunately, the keyboard designs disclosed in the '456, '604 and '221 patents provide relatively limited adjustability in accordance with the preference of the user.

Various newer approaches to keyboards with alternate design have been disclosed. For example, U.S. Pat. No. 4,824,268 discloses a keyboard design in which the individual keys on the keyboard are arranged such that the user's hands are positioned on the home keys of the keyboard. The design also ensures that reaching of other keys is natural and effortless. Unfortunately, the keyboard disclosed in the '268 patent does not utilize a standard QWERTY configuration. As such, the keyboard disclosed the '268 patent would likely require retraining of users. Moreover, due to the space requirements for the designed keyboard layout disclosed in the '268 patent, such a keyboard layout would take up too much space to be practical for a notebook computer.

U.S. Pat. No. 5,073,050 discloses a detached keyboard assembly for use with a desk top computer. The keyboard assembly includes a split keyboard, carried by a telescoping track to enable the keyboard sections to be separated and rotated about three orthogonal planes. Not only is the keyboard assembly disclosed in the '050 patent not suitable for any portable computers, but such a keyboard assembly would also be relatively expensive to manufacture.

U.S. Pat. No. 5,160,919 discloses another alternate design keyboard assembly. In particular, a split keyboard is disclosed which includes two sections spaced apart and rigidly mounted in a generally vertical direction to force the user's palms to be generally vertical and facing one another during use. Since the split keyboard sections are fixed in place, such a design provides relatively limited adjustability in accordance with the individual preference of the user.

U.S. Pat. No. 5,178,477 also discloses a keyboard, formed as a multi-plane device arranged with the various keys disposed at different planes. The keyboard is also split into two fixed sections arranged such that each of the keyboard sections are at symmetrical angles with respect to the centerline through the base of the unit. Such a keyboard configuration has several disadvantages. For example, the multi-plane configuration makes it unsuitable for use in any portable computer, especially a notebook computer. In addition, such a configuration, the location of the keys are fixed in place and, therefore, cannot be adjusted to accommodate the preference of individual users.

The published PCT Application No. PCT/US91/09448 filed on Dec. 16, 1991 discloses a portable personal computer which provides an alternate design for a keyboard.

SUMMARY OF THE INVENTION

It is an object of the present invention to provide an adjustable keyboard system which solves the problems of the prior art.

It is yet another object of the present invention to provide an adjustable keyboard assembly formed as a split keyboard which enables the position of the keyboard sections to be adjusted by the user to provide optimum adjustability in accordance with the user's preference.

It is yet another object of the present invention to provide an adjustable keyboard assembly for use in portable personal computers, especially notebook computers, that is formed as a split keyboard and removable from the portable personal computer housing to enable the relative positions of the keyboard sections to be selected by the user whether the keyboard assembly is carried by or removed from the portable personal computer housing to provide optimal adjustability according to the user's preference.

Briefly, the present invention relates to an adjustable keyboard assembly for a portable personal computer and, in particular, to an adjustable keyboard assembly which includes a keyboard, split along a predetermined breakline defining two keyboard sections removable from the portable personal computer housing. In order to facilitate angular positioning of the keyboard sections as well as removal of the keyboard sections from the portable personal computer housing, the keyboard sections are mechanically coupled together, for example, with a hinge at one end of the breakline. Such a configuration enables the relative angular positions of the keyboard sections to be relatively easily positioned by the user according to the user's preference both on or removed from the portable personal computer housing, as well as facilitates removal of the keyboard assembly. Unlike other known alternate keyboard designs, the keyboard assembly in accordance with the present invention is formed in standard QWERTY format so as not to require retraining of users.

DESCRIPTION OF THE DRAWINGS

These and other objects of the present invention will be readily apparent from the following description and attached drawings wherein.

DETAILED DESCRIPTION OF THE PREFERRED EMBODIMENT

Figure 2:
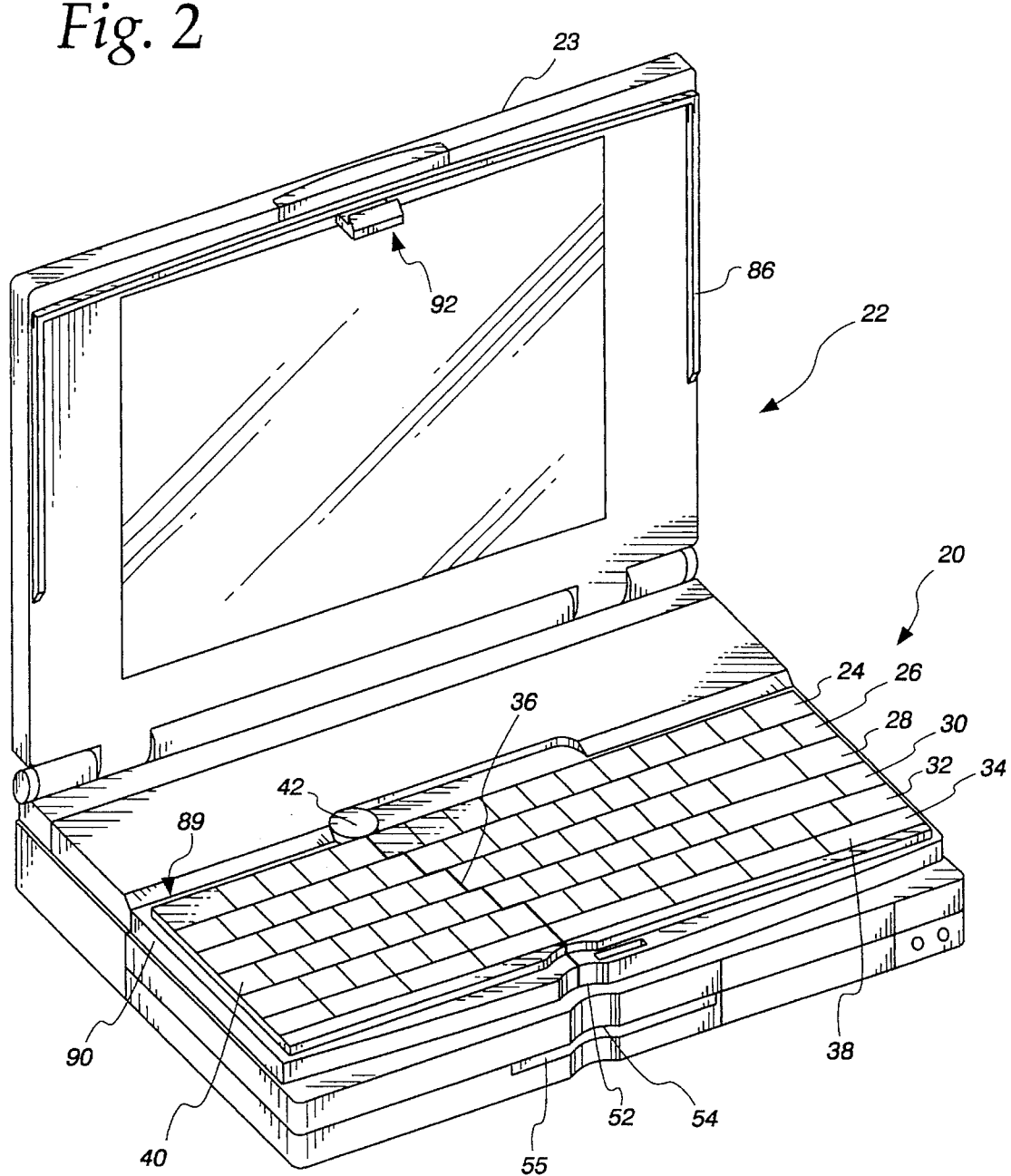
FIG. 2 is a perspective view of the portable personal computer illustrated in FIG. 1, shown with the cover in an open position, illustrating the keyboard assembly in accordance with the present invention with the split keyboard sections in a closed position.

The present invention relates to an adjustable keyboard assembly for a portable personal computer and, in particular, to an adjustable keyboard assembly that is particularly well suited for notebook size portable personal computers. Referring to FIG. 2, an adjustable keyboard assembly in accordance with the present invention, generally identified with the reference number 20 as shown in a normal position carried by a notebook size portable personal computer 22 with its cover 23 in an open position. The keyboard assembly 20 is formed as a standard IBM type AT keyboard with a plurality of function keys (not shown) disposed along a top row 24. In order to avoid the need to retrain users, the remaining keys are disposed in horizontal rows 26, 28, 30, 32 and 34 in a standard QWERTY format.

Figure 4:
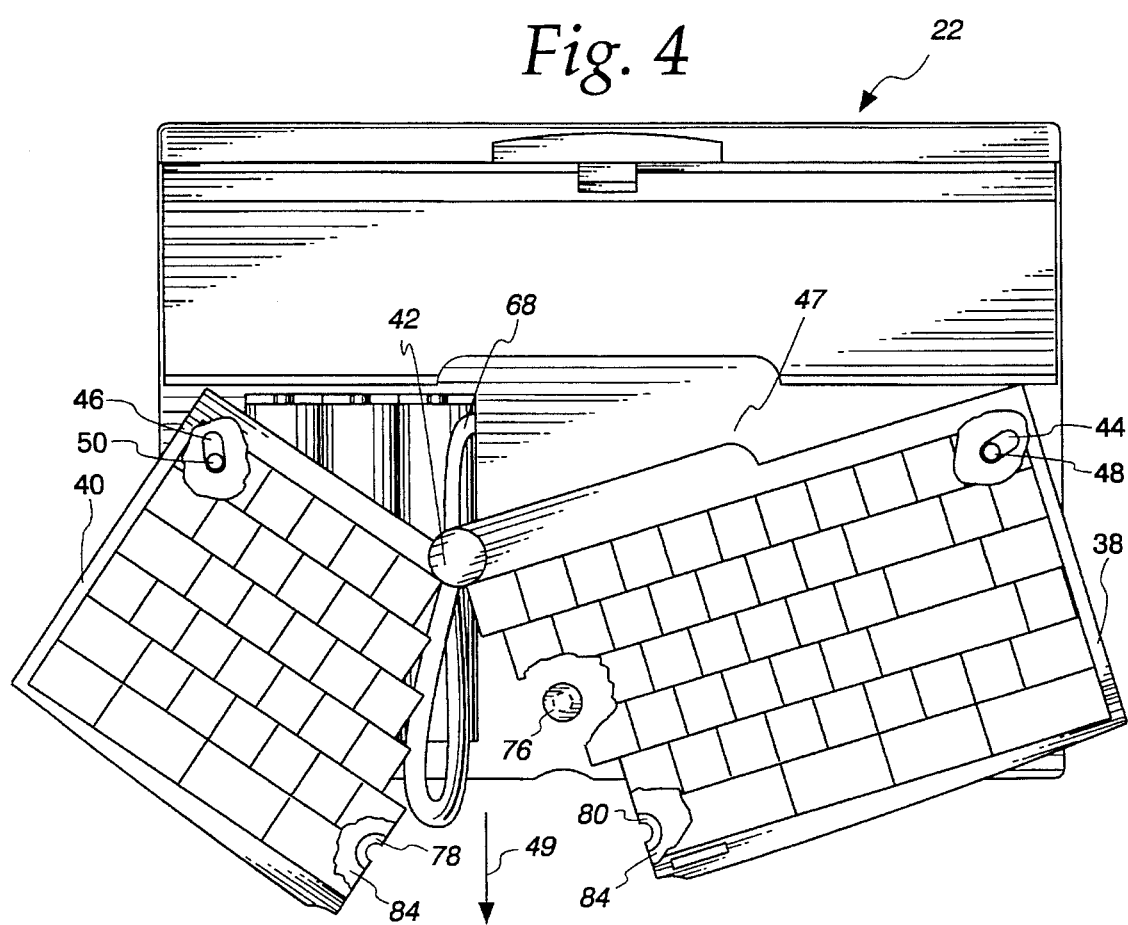
FIG. 4 is similar to FIG. 3 but shown with the keyboard sections in a split position shown with cutaway sections illustrating the limit assembly in a split position.
Figure 5:
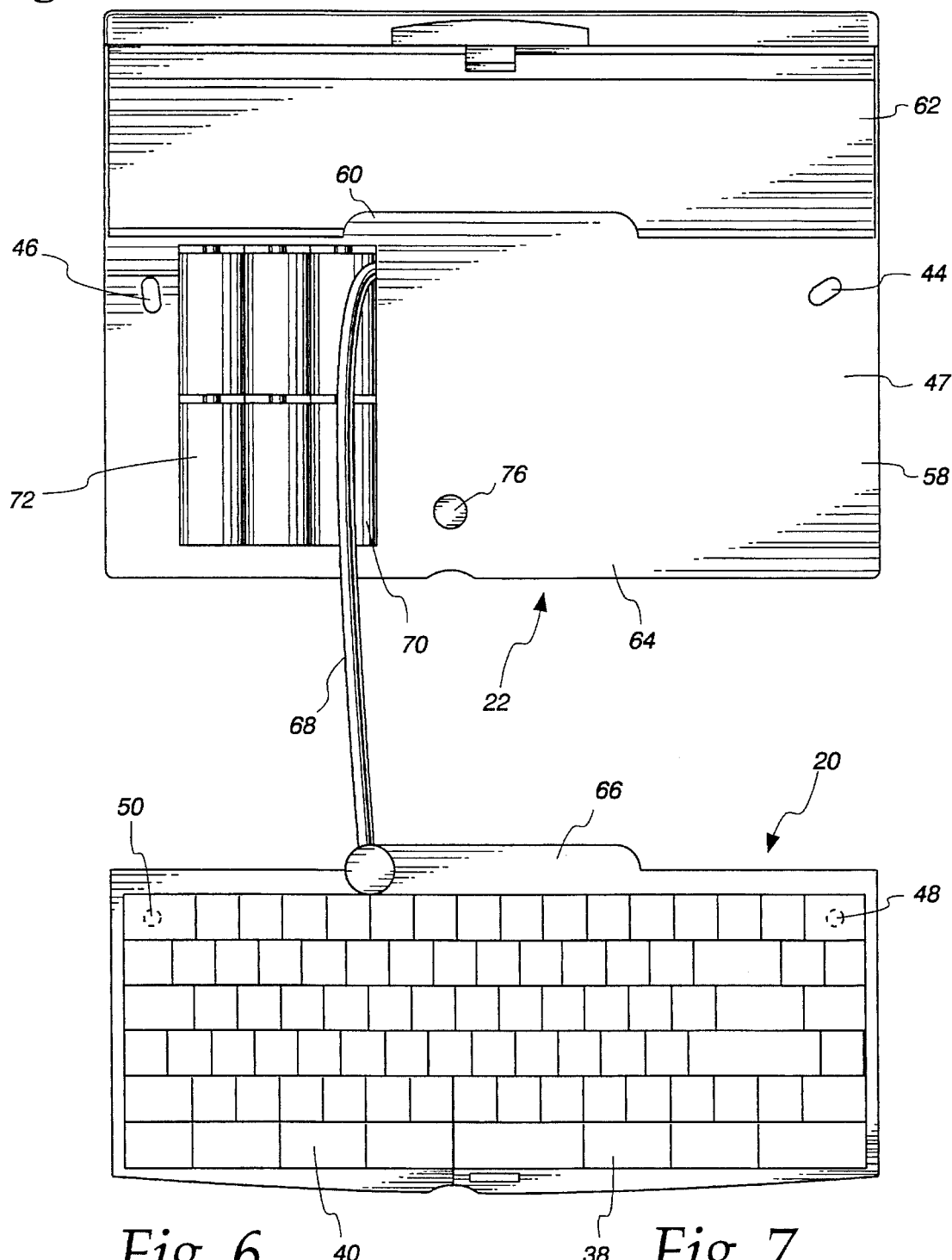
FIG. 5 is similar to FIG. 3 but shown with the keyboard assembly removed from the portable personal computer housing.

As indicated by the breakline 36, formed in the shape of a staircase, the keyboard 20 is split into two sections, defining a right keyboard section 38 and a left keyboard section 40. In order to facilitate angular positioning as removal of the keyboard sections 38 and 40 from the portable personal computer housing, the keyboard sections 38 and 40 are mechanically coupled together, for example, by way of a hinge 42 at one end of the breakline 36, adjacent the top row 24. The mechanical coupling not only facilitates removal of the keyboard assembly 20 from the portable personal computer housing 22, as shown in FIG. 5 and split if desired, but also enables the relative angular position of the keyboard sections 38 and 40 to be relatively easily adjusted by the user to provide optimal adjustability in accordance with the user's preference, as shown in FIG. 4.

Figure 3:
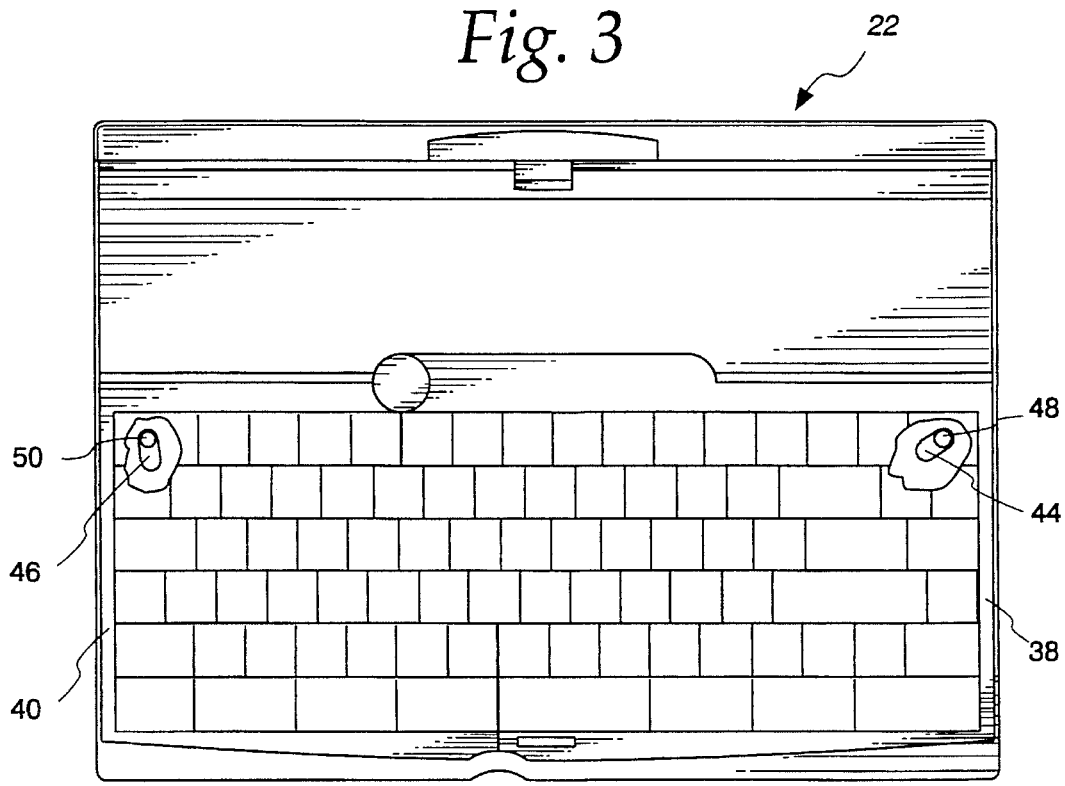
FIG. 3 is a top plan view of the portable personal computer illustrated in FIG. 2 shown with cutaway sections to illustrate a limit assembly in accordance with the present invention in a normal position.

In order to limit translation movement of the keyboard sections 38 and 40 while the keyboard sections 38 and 40 are being split apart when the keyboard assembly 20 is carried by the portable personal computer 22, a limit assembly which includes a pair of oppositely disposed elongated slots 44 and 46 (FIG. 5) is provided. These slots 44 and 46 are formed in a base portion 47 of the portable personal computer 22, disposed adjacent the ends of the top row 24 (FIG. 2) of the keyboard 20. These slots 44 and 46 cooperate with pins 48 and 50 (FIG. 5) which extend downwardly from the underside of each of keyboard sections 38 and 40, adjacent the top corner of each keyboard section 38 and 40 to limit translation of the keyboard sections 38 and 40 in order to facilitate rotation of the keyboard sections 38 and 40 and to prevent the keyboard sections 38 and 40 from being inadvertently removed from the portable personal computer 22. In particular, FIG. 3 illustrates in cutaway the position of the pins 48 and 50 within the slots 44 and 46, respectively, when the keyboard assembly 20 is not split. FIG. 4 shows in cutaway the position of the pins 48 and 50 when the keyboard sections 38 and 40 are split. While the keyboard sections 38 and 40 are being split, the pins 48 and 50, in cooperation with the elongated slots 44 and 46, respectively, act to capture and define moveable pivot points for the corners of each of the keyboard sections 38 and 40 to facilitate rotation of the keyboard sections 38 and 40 and to limit translation of the keyboard sections 38 and 40 along the base portion 47 of the portable personal computer housing.

The size and shape of the elongated slots 44 and 46 are selected to enable the respective keyboard sections 38 and 40 to pivot about their respective pins 48 and 50. During such action, the hinge 42 enables the relative angular position between the keyboard sections 38 and 40 to be rotated relative to one another to provide optimal adjustability in accordance with the user's preference. While the keyboard sections 38 and 40 are rotating relative to the hinge 42, the pins 48 and 50 move along the respective slots 44 and 46 capturing the corners of the keyboard sections 38 and 40 in the position shown in FIG. 4 in order to enable the hinge 42 to be translated in the direction of the arrow identified with the reference numeral 49 (FIG. 4).

An important aspect of the present invention relates to the ease which a user can adjust the relative angular position of the keyboard sections 38 and 40 even while using the keyboard assembly 20. In particular, an arcuate notch 52 (FIG. 2) is formed on opposite ends of the breakline 36, opposite the hinge 42. The arcuate notch 52 is formed so that the radius of curvature of the notch 52 is constant and symmetrical relative to the breakline 36 to form a split notch. By providing the split arcuate notch 52 adjacent the breakline 36, the user can adjust the relative angular positions of the keyboard sections 38 and 40 while using the keyboard 20 rather easily with a thumb from each hand. In order to provide a more uniform appearance, the arcuate notch 52 may be formed adjacent to and similar to an arcuate notch 55 formed adjacent an opening 54 for a disk drive (not shown).

Figure 8:
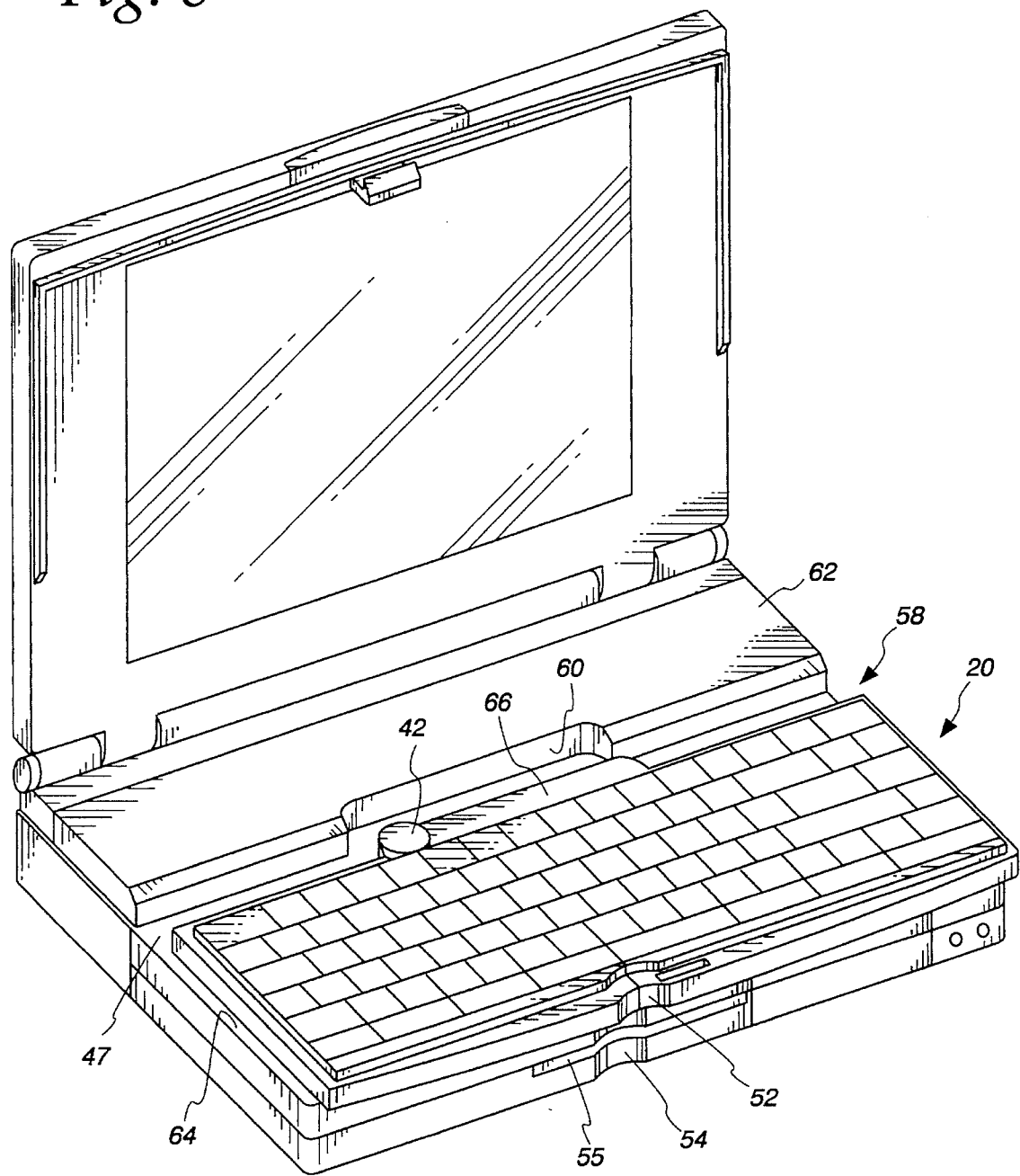
FIG. 8 is a perspective view similar to FIG. 2, shown with the keyboard assembly partially removed.

With reference to FIGS. 3, 5 and 8, the keyboard assembly 20 is normally carried by a base portion 47 of a portable personal computer 22, such as a notebook size portable personal computer. As best illustrated in FIGS. 5 and 8, the base portion 47 of the portable personal computer 22 is formed as a stepped surface 58 with a centrally disposed elongated notch 60 defining an upper base surface 62 and a lower base surface 64. The elongated notch 60 is selected to be complementary to a centrally disposed tongue 66 formed adjacent the top row 24 of the keyboard assembly 20. The size of the lower base surface 64 is selected to coincide with the size of the keyboard assembly 20 in a closed position. The height of the stepped surface 58 is selected such that the upper base surface 62 is at about roughly the same elevation as the keyboard assembly 20 when the keyboard assembly 20 is in the position shown in FIG. 3.

As mentioned above, the keyboard assembly 20 can be split, as illustrated in FIG. 4, according to the user's preference. In accordance with another important aspect of the present invention, the keyboard assembly 20 can also be removed from the portable personal computer 22, as shown in FIG. 5. Once the keyboard assembly 20 is removed from the portable personal computer 22, the keyboard assembly 20 can be used in a normal format (i.e., keyboard sections 38 and 40 together) or with the respective keyboard sections 38 and 40 split to suit the user's preference. During such conditions when the keyboard assembly 20 is removed from the base portion 64 of the portable personal computer 22, the movable pivot pins 48 and 50 form legs to tilt the keyboard assembly 20.

In order to remove the keyboard assembly 20 from the base portion 47 of the portable personal computer 22, the keyboard sections 38 and 40 are split apart enough to release a latch assembly 72 (discussed below) to enable the keyboard assembly 20 to be lifted off the base portion 47. The keyboard assembly 20 may then be placed on a surface adjacent the portable personal computer 22.

In order to provide an electrical connection to the keyboard assembly 20 to the portable personal computer 22, an electrical conductor 68 is provided through the hinge 42. A suitable hinge with an electrical conductor arrangement is disclosed in U.S. Pat. No. 4,571,456, hereby incorporated by reference. It is also contemplated that individual conductors can be supplied to each of the keyboard sections 38 and 40. Either such embodiment is considered to be within the broad scope of the present invention.

In either embodiment, the length of the electrical conductor 68 is selected to enable the keyboard assembly 20 to be totally removed from the base portion 47 of the portable personal computer 22. In a normal position when the keyboard assembly 20 is carried by the base portion 47 of the portable personal computer 22, the excess portion of the electrical conductor 68 is stored within a cavity 70 normally used for carrying one or more batteries 72; enlarged to accommodate the excess portion of that electrical conductor 68 during such a condition.

Figure 6:
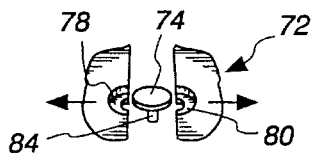
FIG. 6 is a cutaway perspective view of a keyboard latch in accordance with the present invention, shown in an unlatched position.
Figure 7:
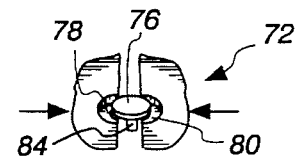
FIG. 7 is similar to FIG. 6, shown in an almost latched position.

Another important aspect of the present invention relates to the ability to latch the respective halves 38 and 40 of the keyboard assembly 20 to enable the portable personal computer 22 to be transported. In particular, a latch assembly 72, which consists of a pin 74 with an enlarged head 76, rigidly disposed in the base portion 47 of the portable personal computer 22 (FIG. 5) and a pair of countersunk arcuate notches 78 and 80 (FIGS. 4,6 and 7) are formed in a bottom surface 84 (FIGS. 4, 6 and 7) of each of the keyboard sections 38 and 40. Each notch 78 and 80 may be formed as a semicircle and disposed to be aligned with the pin 74. The notches 78 and 80 are countersunk as shown best in FIGS. 6 and 7 to receive the enlarged head portions 76 of the pin 74. As such, when the keyboard assembly 20 is in a closed position, the enlarged head 76 prevents upward movement (i.e., movement in a direction perpendicular to the plane of the keyboard assembly 22) of the keyboard assembly 22.

Figure 1:
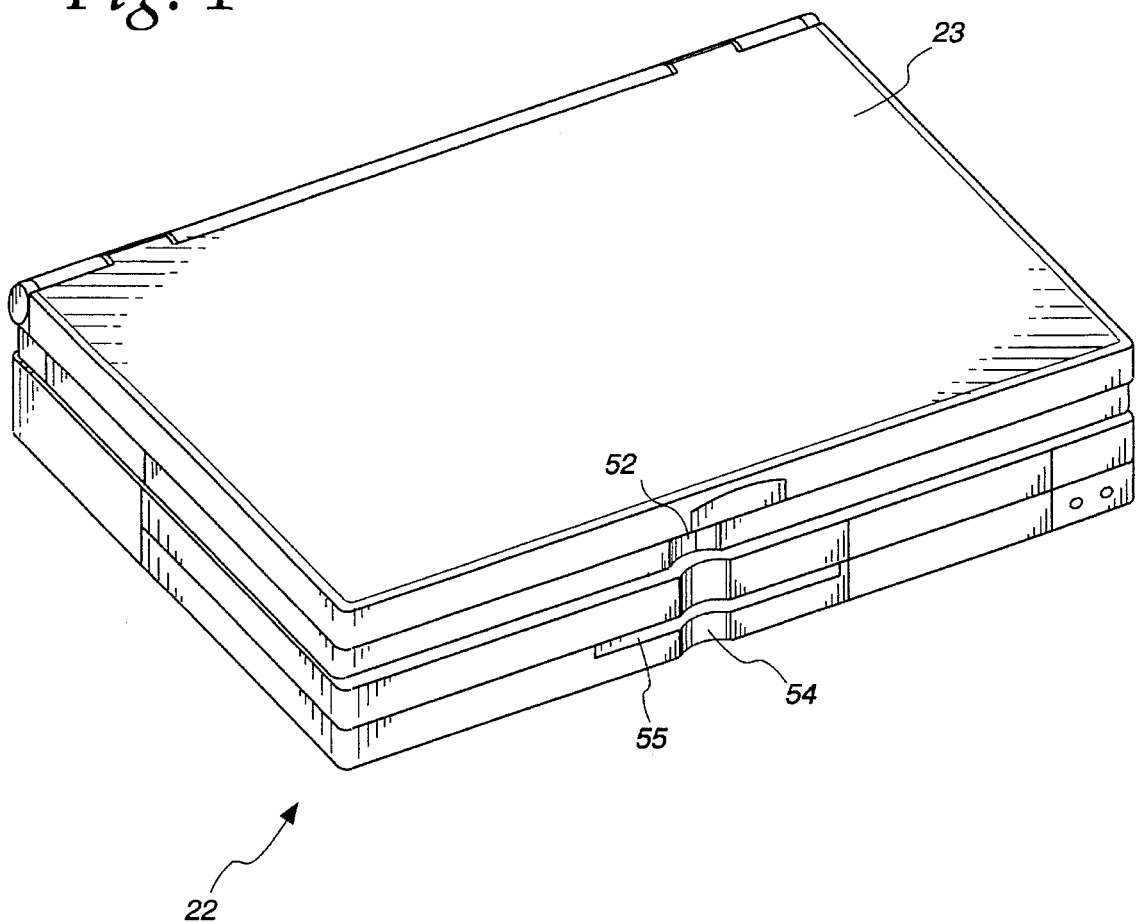
FIG. 1 is a perspective view of a notebook size portable personal computer which incorporates the keyboard assembly in accordance with the present invention, shown with the cover in a closed position.

As best illustrated in FIG. 2, a lip 86, formed about the periphery of the portion of a cover 23 for the portable personal computer 22, prevents the keyboard sections 38 and 40 from pivoting with respect to the hinge 42 when the cover 23 is in a closed position, as illustrated in FIG. 1. In particular, the keyboard 20 assembly is formed with a stepped surface 89 defining a peripheral shoulder 90 (FIG. 5). The lip 86 seats against the peripheral shoulder 90 when the cover 23 is in a closed position to capture the keyboard sections 38 and 40 in place when the cover 23 is in a closed position illustrated in FIG. 1. A conventional cover latch assembly 92 is used to maintain the cover 23 in a latched position once the cover 23 is closed. Thus, when the cover 23 is latched, the lip 86 prevents pivotal movement of the keyboard sections 38 and 40 while the latch assembly 92 latches the cover 23 to enable safe and easy transport of the portable personal computer 22.

Obviously, many modifications and variations of the present invention are possible in light of the above teachings. Thus, it is to be understood that within the scope of the appended claims, the invention may be practiced otherwise than as specifically designate above.

What is desired to be claimed by a Letters Patent is:

We claim:

1. A keyboard assembly for a portable personal computer comprising:

a keyboard, split at a predetermined breakline, defining two keyboard sections;

means for rotatably coupling said keyboard sections together about a predetermined pivot axis, adjacent one end of said breakline, to enable said keyboard sections to be rotated relative to one another from a first position, wherein said keyboard sections are adjacent one another to a second position wherein said keyboard sections are split apart; and means for preventing movement of said keyboard sections in a direction generally parallel to said pivot axis, wherein said preventing means includes a pair of predetermined notches formed adjacent opposing ends of said breakline in said keyboard sections, said predetermined notches adapted to receive a pin with an enlarged head in a predetermined position to prevent movement of said keyboard sections in a direction generally parallel to said pivot axis.

2. In a portable personal computer having a housing with a base portion for carrying a keyboard and a cover, the improvement comprising:

a keyboard split at a predetermined breakline defining two keyboard sections;

means for enabling said two keyboard sections to rotate relative to one another from a first position wherein said keyboard sections are adjacent one another to a second position wherein said keyboard sections are split apart, wherein said enabling means includes means for rotatably coupling said keyboard sections together about a predetermined pivot axis adjacent one end of said breakline to enable said keyboard sections be rotated relative to one another, wherein said predetermined pivot axis moves in a direction generally perpendicular to said pivot axis when said keyboard sections are rotated relative to one another; and means for limiting translational movement of said keyboard sections, wherein said limiting means includes means for limiting translational movement of an end of each keyboard section opposite said breakline in a direction generally perpendicular to said predetermined pivot axis and wherein said translational movement limiting means includes pins rigidly carried by one or the other of said keyboard sections or said base of said portable personal computer and cooperating predetermined apertures formed in the other of said keyboard sections or base portion for capturing the ends of said keyboard sections opposite said breakline.

3. In a portable personal computer having a housing with a base portion for carrying a keyboard and a cover, the improvement comprising:

a keyboard split at a predetermined breakline defining two keyboard sections;

means for enabling said two keyboard sections to rotate relative to one another from a first position wherein said keyboard sections are adjacent one another to a second position wherein said keyboard sections are split apart, wherein said enabling means includes means for rotatably coupling said keyboard sections together about a predetermined pivot axis adjacent one end of said breakline to enable said keyboard sections be rotated relative to one another; and means for preventing movement of said keyboard sections in a direction generally parallel to said predetermined pivot axis when said keyboard sections are in a first position, wherein said preventing means includes means for capturing said keyboard sections in a first position to prevent movement generally parallel to said predetermined pivot axis and wherein said capturing means includes predetermined notches formed in said keyboard sections and a fixed pin with an enlarged head portion fixed to said base portion of said portable personal computer at a location selected to be received by notches in said keyboard sections in said first position.

4. In a portable personal computer having a housing with a base portion for carrying a keyboard and a cover, the improvement comprising:

a keyboard split at a predetermined breakline defining two keyboard sections;

means for enabling said two keyboard sections to rotate relative to one another from a first position, wherein said keyboard sections are adjacent one another to a second position wherein said keyboard sections are split apart, wherein said enabling means includes means for rotatably coupling said keyboard sections together about a predetermined pivot axis adjacent one end of said breakline to enable said keyboard sections be rotated relative to one another; and means for facilitating rotation of said keyboard sections while said keyboard is in use, wherein said facilitating means includes notches formed in each of said keyboard sections adjacent said breakline at an end opposite said coupling means, said notches being disposed to be contiguous when said keyboard sections are in a first position.

\* \* \* \* \*